US010680935B2

(12) United States Patent
Walston et al.

(10) Patent No.: US 10,680,935 B2
(45) Date of Patent: Jun. 9, 2020

(54) AUTOMATIC RECOVERY FROM IMPAIRED DATA PATH

(71) Applicant: ARRIS Enterprises, Inc., Suwanee, GA (US)

(72) Inventors: Allen Walston, Atlanta, GA (US); Angelo Bione, Lawrenceville, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 436 days.

(21) Appl. No.: 14/833,835

(22) Filed: Aug. 24, 2015

(65) Prior Publication Data

US 2017/0063669 A1    Mar. 2, 2017

(51) Int. Cl.
*H04L 12/707* (2013.01)
*H04L 29/08* (2006.01)
*H04L 12/703* (2013.01)
*H04L 12/26* (2006.01)
*H04L 12/24* (2006.01)

(52) U.S. Cl.
CPC .......... *H04L 45/22* (2013.01); *H04L 41/0672* (2013.01); *H04L 41/0681* (2013.01); *H04L 43/0805* (2013.01); *H04L 45/28* (2013.01); *H04L 67/141* (2013.01)

(58) Field of Classification Search
CPC .. H04L 45/02; H04L 67/141; H04L 43/08582
See application file for complete search history.

(56) References Cited

U.S. PATENT DOCUMENTS

| | | | |
|---|---|---|---|
| 6,742,186 B1* | 5/2004 | Roeck | H04L 12/2801 370/449 |
| 2010/0303137 A1* | 12/2010 | Cheng | H04L 12/2801 375/222 |
| 2011/0150058 A1* | 6/2011 | Oh | H04L 5/003 375/222 |
| 2013/0070784 A1* | 3/2013 | Denney | H04J 3/1694 370/462 |
| 2014/0185428 A1* | 7/2014 | Thibeault | H04L 47/12 370/225 |

* cited by examiner

*Primary Examiner* — Chris Parry
*Assistant Examiner* — Steven C Nguyen
(74) *Attorney, Agent, or Firm* — Wenderoth, Lind & Ponack, L.L.P.

(57) ABSTRACT

Methods, systems, and computer readable media can be operable to facilitate the recovery of a failed data path. A determination may be made that one or more channels have become unavailable to a central device. The central device may identify an opportunity to attempt to recover the one or more unavailable channels, the opportunity being based upon a waiting period, time-of-day, device activity, or other parameter. A communication interface associated with the central device may be re-initialized so that the central device can attempt to recover the one or more unavailable channels.

20 Claims, 5 Drawing Sheets

AUTOMATIC RECOVERY FROM IMPAIRED DATA PATH

TECHNICAL FIELD

This disclosure relates to recovery of an impaired data path.

BACKGROUND

A central device, such as a cable modem, facilitates communications between subscriber/client devices and a cable headend. Typically, a cable modem is designed to receive communications from a cable headend along one or more downstream channels (e.g., receive channel set (RCS)) and to output communications to the cable headend along one or more upstream channels (e.g., transmit channel set (TCS)). In some cases, a cable modem may be configured to output communications along a bonded upstream channel, wherein the bandwidth of the bonded upstream channel is a combination of the individual upstream channels making up the bonded channel. Greater throughput may be obtained when a cable modem outputs data along multiple upstream channels (e.g., a bonded channel).

A cable modem using one or more bonded upstream channels may enter into a partial service state when one or more individual upstream channels of one or more bonded channels become unavailable. While operating in a partial service state, a cable modem may remain online but will be operating with fewer upstream resources at its disposal. Typically, when a cable modem enters an upstream partial service state, the cable modem can get stuck in the partial service state even after the condition triggering the state is remedied. After a period of time, the headend may cease the issuing of transmit grants to the cable modem for the affected upstream channels. The cable modem can remain in the partial service state until the cable modem resets or re-registers with the headend. Therefore, it is desirable to improve upon methods and systems for remedying bonded channels that become impaired.

BRIEF DESCRIPTION OF THE DRAWINGS

Like reference numbers and designations in the various drawings indicate like elements.

DETAILED DESCRIPTION

Figure 1:
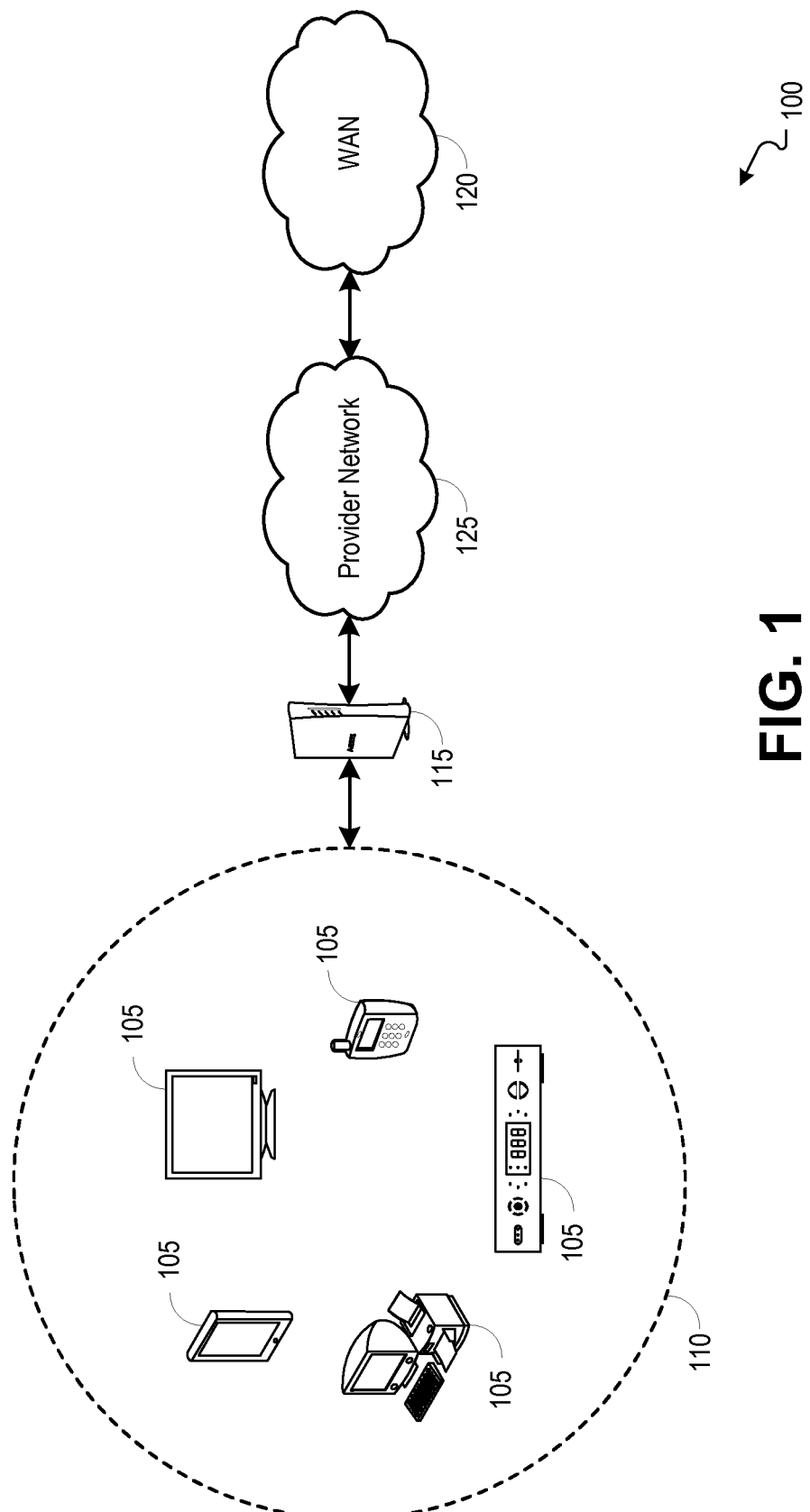
FIG. 1 is a block diagram illustrating an example network environment operable to facilitate the recovery of a failed data path.

It is desirable to improve upon methods and systems for recovering a failed data path. Methods, systems, and computer readable media described herein can be operable to facilitate the recovery of one or more channels within a bonded channel set that have become impaired. A determination may be made that one or more channels have become unavailable to a central device. The central device may identify an opportunity to attempt to recover the one or more unavailable channels (e.g., re-establish communications along the one or more impaired or unavailable channels), the opportunity being based upon a waiting period, time-of-day, device activity, and/or others factors or parameters. A communication interface associated with the central device may be re-initialized so that the central device can attempt to recover the one or more unavailable channels. Upon re-initialization of the communication interface, the central device may attempt to re-establish communications with an upstream network element along the one or more unavailable or impaired channels.

An embodiment of the invention described herein may include a method comprising: (a) determining that one or more channels within a bonded channel set have become unavailable for a central device; (b) starting a first timer, wherein the first timer is set for a first duration; (c) when the first timer expires, determining whether the one or more channels within the bonded channel set that were determined to be unavailable for the central device have become available for the central device; and (d) if the determination is made that the one or more channels within the bonded channel set have not become available for the central device, re-initializing a communication interface associated with the central device, wherein re-initialization of the communication interface causes the central device to make an attempt to re-establish communications along each channel within the bonded channel set.

According to an embodiment of the invention, after re-initializing the communication interface, it is determined that each channel within the bonded channel set is available for the central device.

According to an embodiment of the invention, the method described above further comprises: (a) after re-initializing the communication interface, determining that one or more channels within the bonded channel set are unavailable for the central device; (b) starting a second timer, wherein the second timer is set for a second duration, the second duration being a different duration than the first duration; and (c) when the second timer expires, re-initializing the communication interface associated with the central device, wherein re-initialization of the communication interface causes the central device to make a subsequent attempt to re-establish communications along each channel within the bonded channel set.

According to an embodiment of the invention, the method described above further comprises: (a) after the subsequent attempt to re-establish communications along each channel within the bonded channel set, determining that one or more channels within the bonded channel set are unavailable for the central device; (b) starting a third timer, wherein the third timer is set for a third duration, the third duration being a longer duration than the second duration; and (c) when the third timer expires, re-initializing the communication interface associated with the central device, wherein re-initialization of the communication interface causes the central device to make a subsequent attempt to re-establish communications along each channel within the bonded channel set.

According to an embodiment of the invention, the first timer is started after determining that the central device is not in a power-saving mode.

According to an embodiment of the invention, the method described above further comprises: (a) after the first timer expires, and before re-initializing the communication interface associated with the central device, determining that a call is active at the central device; and (b) delaying re-initialization of the communication interface until after determining that the call has been terminated.

According to an embodiment of the invention, the method described above further comprises: (a) after the first timer expires, and before re-initializing the communication interface associated with the central device, determining that a data flow is active at the central device; and (b) delaying re-initialization of the communication interface until after determining that the data flow has been terminated.

According to an embodiment of the invention, the method described above further comprises postponing the re-initialization of the communication interface associated with the central device until a designated period of time when the first timer expires outside of the designated period of time.

An embodiment of the invention described herein may include an apparatus for processing real time operations and non-real time operations, the apparatus comprising a module configured to: (a) a communication interface configured to be used to output upstream communications along a plurality of channels within a bonded upstream channel set; (b) a monitoring module configured to determine that one or more channels within the bonded upstream channel set have become unavailable for outputting upstream communications through the communication interface; (c) a re-initialization module configured to: (i) start a first timer, wherein the first timer is set for a first duration; and (ii) when the first timer expires, re-initialize the communication interface, wherein re-initialization of the communication interface causes an attempt to re-establish communications along each channel within the upstream bonded channel set.

An embodiment of the invention described herein may include one or more non-transitory computer readable media having instructions operable to cause one or more processors to perform the operations comprising: (a) determining that one or more channels within a bonded channel set have become unavailable for a central device; (b) starting a first timer, wherein the first timer is set for a first duration; (c) when the first timer expires, determining whether the one or more channels within the bonded channel set that were determined to be unavailable for the central device have become available for the central device; and (d) if the determination is made that the one or more channels within the bonded channel set have not become available for the central device, re-initializing a communication interface associated with the central device, wherein re-initialization of the communication interface causes the central device to make an attempt to re-establish communications along each channel within the bonded channel set.

FIG. 1 is a block diagram illustrating an example network environment 100 operable to facilitate the recovery of a failed data path. In embodiments, video, voice, and/or data services may be delivered to one or more client devices 105 over one or more data paths. For example, data paths may include one or more upstream or downstream channels, bonded upstream or downstream channel groups, upstream or downstream channels making up a bonded upstream or downstream bonded channel group, and other data transport mediums. Client devices 105 may include a television, mobile device, tablet, computer, set-top box (STB), telephone, gaming device, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, telephony services, and others. It should be further understood that the devices shown in FIG. 1 may be integrated. For example, a television may be connected to and controlled by a STB.

Multiple services may be delivered to client devices 105 over a local network 110. The local network 110 may include a local area network (LAN), wireless local area network (WLAN), personal area network (PAN), Multimedia over Coax Alliance (MoCA) network, mobile hotspot network, and others. The local network 110 may be provided at a subscriber premise by a central device 115. The central device 115 may include any device configured to facilitate communications between a headend device and one or more client devices, such as a modem or other access device. The central device 115 may be integrated with other devices. For example, a modem may reside within a gateway device, STB, or other devices. It will be appreciated by those skilled in the relevant art that delivery of the multiple services over the local network 110 may be accomplished using a variety of standards and formats.

In embodiments, multiple services (e.g., video, voice, and/or data services) may be delivered from a wide-area network (WAN) 120 to the local network 110 through a connection to a provider network 125. The provider network 125 may include an optical network, hybrid fiber coaxial (HFC) network, digital subscriber line (DSL) network, twisted-pair, mobile network, high-speed data network, MoCA network, and any other network configured to transport signals over multiple channels. Multiple systems operator (MSO) devices and/or networks within the WAN 120 may be used to provide, manage, and/or troubleshoot the multiple services provided to subscribers.

It will be appreciated by those skilled in the relevant art that client devices 105 may be capable of interacting and communicating with each other and/or with a central device 115 over various wireless communication standards (e.g., Wi-Fi, Bluetooth, etc.). Client devices 105 connected to a local network 110 may receive services according to one or more subscriptions entered into between a subscriber and service provider.

In embodiments, the central device 115 can receive downstream communications (e.g., communications received from an upstream network element and destined for the central device 115 or a client device 105 associated with the central device 115) from the provider network 125 along one or more downstream channels, and the central device 115 can output upstream communications (e.g., communications generated at the central device 115 or received from a client device 105 associated with the central device 115 and destined for an upstream network component) to an upstream network component (e.g., headend device such as a cable modem termination system (CMTS), digital subscriber line access multiplexer (DSLAM), etc.) through one or more upstream channels. The central device 115 may be configured to output upstream communications through one or more bonded upstream channels. A bonded upstream channel may be a combination of multiple upstream channels, and communications can be output along a plurality of the multiple upstream channels making up the bonded channel simultaneously.

A central device 115 using one or more bonded upstream channels may enter into a partial service state when one or more individual upstream channels of one or more bonded channels become unavailable. When one or more individual upstream channels become unavailable, an upstream component (e.g., CMTS) may refrain from sending transmit opportunities to the central device 115 for the unavailable channel. It will be appreciated by those skilled in the relevant art that an upstream channel may become unavailable for a variety of reasons (e.g., issue at the central device 115, issue at a CMTS, issue at one or more intermediate network components such as nodes, taps, amplifiers, and others), and that one or more upstream channels may become unavailable during registration between the central device 115 and an upstream component or may become unavailable during normal operation of the central device 115.

In embodiments, the central device 115 can monitor the current bonding state of downstream or upstream channels. During a registration process with a headend device (e.g., CMTS), a central device 115 may receive information identifying a number of upstream channels (e.g., four (4), eight (8), etc.) within a bonded channel group that the central device 115 may use for outputting upstream communications. The central device 115 may identify when or receive a notification when one or more upstream channels within a bonded upstream channel group become unavailable. For example, the central device 115 may determine that one or more upstream channels are unavailable when the central device 115 receives a timeout response associated with an upstream channel or when the central device 115 does not receive a transmit opportunity for an upstream channel within a certain period of time (e.g., thirty (30) seconds, forty (40) seconds, etc.).

When the central device 115 enters a partial service state, the central device 115 can begin a process for identifying an appropriate time to attempt a recovery of the one or more failed upstream channels causing the partial service state. For example, the central device 115 may identify a time when there are no phone calls active at the central device 115 as an appropriate time for a channel recovery attempt. As another example, the central device may identify a time when there are no phone calls and no data flows active at the central device 115 as an appropriate time for a channel recovery attempt.

In embodiments, when the central device 115 enters a partial service state, the central device 115 can postpone a recovery attempt until a designated time period. For example, when the central device 115 enters a partial service state, a timer may be started, and when the timer expires, the central device 115 can attempt re-initialization. As another example, the central device 115 may be configured to attempt re-initialization with an upstream component within a period of time during which use of the central device 115 is most likely to be limited (e.g., overnight such as between midnight and four (4) AM, etc.), and using a time of day acquired from a time of day server, the central device 115 can make a re-initialization attempt during the designated time period.

The central device 115 may also check whether the device is currently in a power-saving mode. When the central device 115 is in a power-saving mode, one or more of a plurality of upstream channels may be made unavailable to the central device 115 so that the central device 115 can power down resources required for maintaining and communicating through the one or more upstream channels. If the central device 115 is in a power-saving mode, the partial service state may be expected, and the central device 115 can determine that a channel recovery attempt is not necessary.

When the identified time for attempting recovery arrives, the central device 115 can make an attempt to recover the failed upstream channel(s). For example, the central device 115 can start a re-initialization attempt (e.g., using a reinit-MAC command), wherein the re-initialization attempt causes a re-initialization of a communication interface (e.g., radio frequency (RF) interface, media access control (MAC) interface, etc.) associated with the central device 115. The re-initialization attempt may be made during a maintenance window provided to a central device 115 by a headend device. Upon re-initialization of the communication interface, the central device 115 can attempt to re-register with an upstream network element (e.g., headend element such as a CMTS). During re-registration, the central device 115 can receive a number of upstream channels within a bonded channel set, and the upstream network element can provide transmission opportunities to the central device 115 for each of the upstream channels. It should be understood that re-initialization may include a reset or reboot of a communication interface at the central device 115, one or more components of the communication interface (e.g., upstream component, downstream component, etc.), or may be a reset or reboot of the central device itself. The re-initialization attempt may cause a re-registration for each channel of an associated RCS or TCS or may only cause a re-registration for one or more impaired or failed channels of an associated RCS or TCS.

After re-initialization, the central device 115 can determine whether the failed upstream channel(s) has been remedied, or whether the central device 115 remains in a partial service state. If the central device 115 remains in a partial service state, the central device 115 can periodically retry an attempt to recover the one or more unavailable upstream channels. The central device 115 may be configured with a maximum number of re-initialization attempts that may be made over a certain period of time so that the issue causing the unavailability of one or more upstream channels does not lead to a perpetual re-initialization cycle at the central device 115.

In embodiments, after a re-initialization attempt, the central device 115 may be configured with a different set of channels making up a RCS or TCS than the set of channels the central device 115 was configured with prior to the re-initialization attempt. For example, if after one or more re-initialization attempts (e.g., after some predetermined number of attempts), the central device 115 continues to operate in a partial service state, the central device 115 may be configured with different channels (e.g., channels making up a RCS or TCS) during a registration with an upstream network element.

Figure 2:
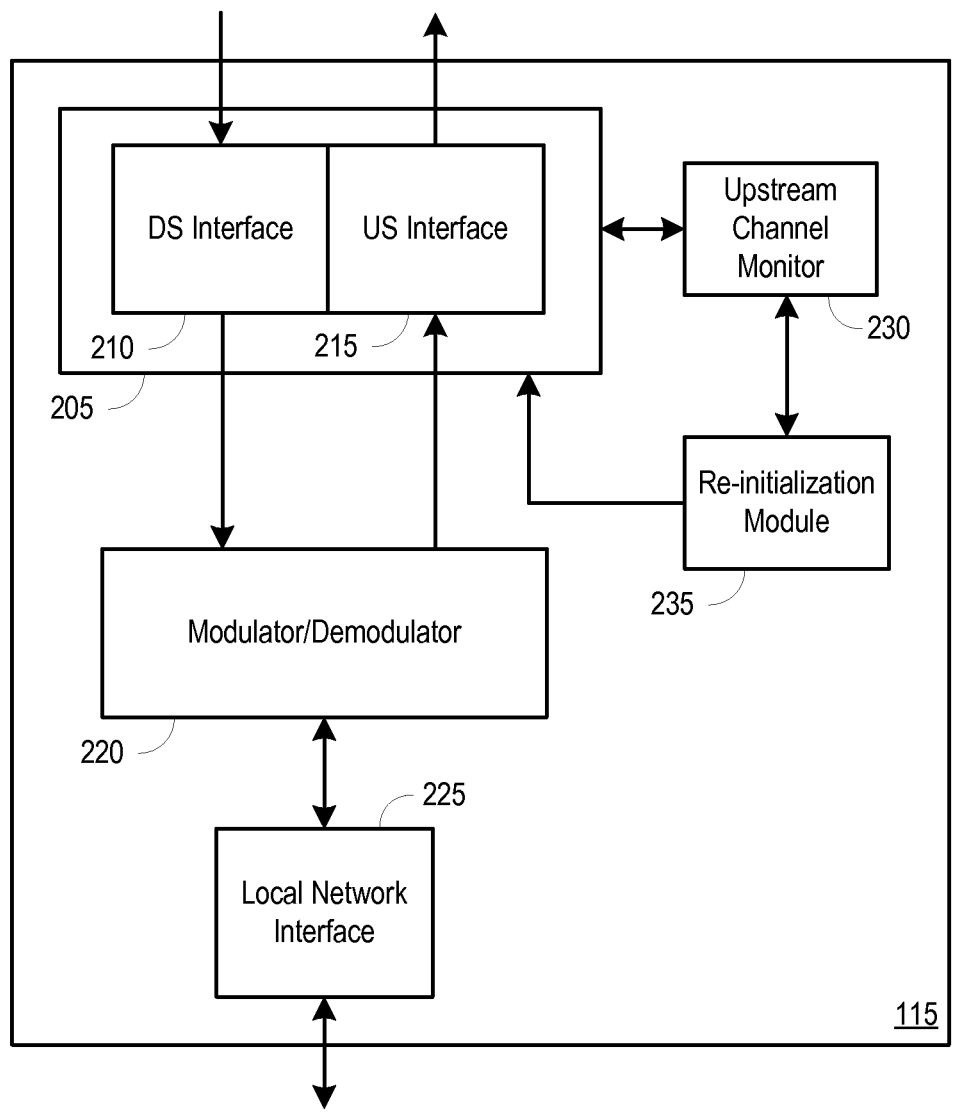
FIG. 2 is a block diagram illustrating an example component operable to facilitate the recovery of a failed data path.

FIG. 2 is a block diagram illustrating an example central device 115 operable to facilitate the recovery of a failed data path. The central device 115 may include a communication interface 205 having a downstream interface 210 and an upstream interface 215, a modulator/demodulator 220, a local network interface 225, an upstream channel monitor 230, and a re-initialization module 235. In embodiments, the central device 115 may be a modem and can operate as a standalone device or can be integrated with other devices such as a gateway device, STB, or others. The communication interface 205 may be a RF interface, MAC interface, or any other type of interface.

In embodiments, the central device 115 may receive downstream communications via a downstream interface 210, and may output upstream communications via an upstream interface 215. Downstream communications may be demodulated at the modulator/demodulator 220 and output to a target device (e.g., client device 105 of FIG. 1) through the local network interface 225. Upstream communications may be received from one or more devices (e.g., client devices 105 of FIG. 1) through the local network interface 225 and modulated at the modulator/demodulator 220 prior to being output through the upstream interface 215. It should be understood that the network interface 225 may include various interfaces configured to be used to output and receive a variety of communication types (e.g., data, voice, wireless, etc.).

The central device 115 may be configured to output upstream communications along one or more bonded upstream channels, wherein each bonded upstream channel includes multiple upstream channels. Through the upstream interface 215, the central device 115 may output upstream communications along the plurality of upstream channels within a bonded channel simultaneously.

In embodiments, the upstream channel monitor 230 may monitor the state of the bonded upstream channel and upstream channels making up the bonded channel. The upstream channel monitor 230 can identify or maintain an understanding of the number of upstream channels (e.g., four (4), eight (8), etc.) within a bonded channel group that the central device 115 may use for outputting upstream communications. For example, the central device 115 may be configured to operate using a predetermined number of upstream channels, and a headend device (e.g., CMTS) may inform the central device 115 of the number of upstream channels the central device 115 is configured to use. The upstream channel monitor 230 can identify when or receive a notification when one or more upstream channels within a bonded upstream channel group become unavailable. For example, the upstream channel monitor 230 may determine that one or more upstream channels are unavailable when the central device 115 receives a timeout response associated with an upstream channel or when the central device 115 does not receive a transmit opportunity for an upstream channel within a certain period of time (e.g., thirty (30) seconds, forty (40) seconds, etc.).

When the upstream channel monitor 230 determines that the central device 115 has entered into a partial service state, the upstream channel monitor 230 can signal the re-initialization module to begin a process for identifying an appropriate time to attempt a recovery of the one or more failed upstream channels causing the partial service state. When the upstream channel monitor 230 is notified that the central device 115 has entered into a partial service state, the upstream channel monitor 230 can start a timer of a predetermined or configurable duration. The predetermined or configurable duration may be a duration of time sufficient to allow the one or more failed upstream channels to be recovered (e.g., a number of minutes, one or more hours, etc.). Upon the expiration of the timer, the re-initialization module 235 can initiate an attempt to recover the one or more failed upstream channels. For example, the re-initialization module 235 can re-initialize the communication interface 205 (e.g., using a reinitMAC command). Re-initialization of the communication interface 205 may include a resetting of the communication interface 205 causing the communication interface 205 to attempt to re-establish communications along the one or more unavailable or failed upstream channels. For example, resetting the communication interface may cause the central device 115 to register with an upstream network component (e.g., headend component such as a CMTS).

In embodiments, the re-initialization module 235 may determine whether a phone call and/or data flow is active at the central device 115 prior to causing a re-initialization of the communication interface 205. Upon the expiration of the timer, the re-initialization module 235 can check whether a phone call and/or data flow is active at the central device 115. If there are no phone calls or data flows active, the re-initialization module 235 can re-initialize the communication interface 205. If a phone call and/or data flow is active, the re-initialization module 235 can delay re-initialization of the communication interface 205 until the phone call(s) and/or data flow(s) have been terminated. For example, the re-initialization module 235 may periodically check whether the phone call(s) and/or data flow(s) are active, or the re-initialization module 235 may receive a notification when the phone call(s) and/or data flow(s) have been terminated. The re-initialization module 235 may determine whether a phone call and/or data flow is active by monitoring the communications passed through the downstream interface 210, the upstream interface 215, and/or the local network interface 225.

In embodiments, when the re-initialization module 235 is notified that the central device 115 has entered into a partial service state, the re-initialization module 235 can postpone re-initialization of the communication interface 205 until a designated time period. For example, the designated period of time may be a period of time during which use of the central device 115 is most likely to be limited (e.g., overnight such as between midnight and four (4) AM, etc.). The re-initialization module 235 may use a time of day acquired from a time of day server to re-initialize the communication interface 205 during the designated time period. The designated period of time may be a maintenance window provided to the central device 115 by an upstream network element.

When the re-initialization module 235 is notified that the central device 115 has entered into a partial service state, the re-initialization module 235 may check whether the central device 115 is currently in a power-saving mode before causing a re-initialization of the communication interface 205. If the central device 115 is in a power-saving mode, the partial service state may be expected, and the re-initialization module 235 can determine that re-initialization of the communication interface 205 is not necessary.

After re-initialization of the communication interface 205, the upstream channel monitor 230 can determine whether the one or more failed upstream channels have been recovered, or whether the central device 115 remains in a partial service state. If the central device 115 remains in a partial service state, the re-initialization module 235 can periodically attempt to recover the one or more unavailable upstream channels. For example, if the central device 115 remains in a partial service state after re-initialization of the communication interface 205, the re-initialization module 235 can start a retry timer, and at the expiration of the retry timer, the re-initialization module 235 can re-initialize the communication interface 205. In embodiments, the duration of the retry timer can be increased with each re-initialization attempt (e.g., first retry timer may be one (1) hour, second retry timer may be two (2) hours, third retry timer may be four (4) hours, etc.). The central device 115 may be configured with a maximum number of re-initialization attempts that may be made over a certain period of time so that the issue causing the unavailability of one or more upstream channels does not lead to a perpetual re-initialization cycle at the central device 115.

Figure 3:
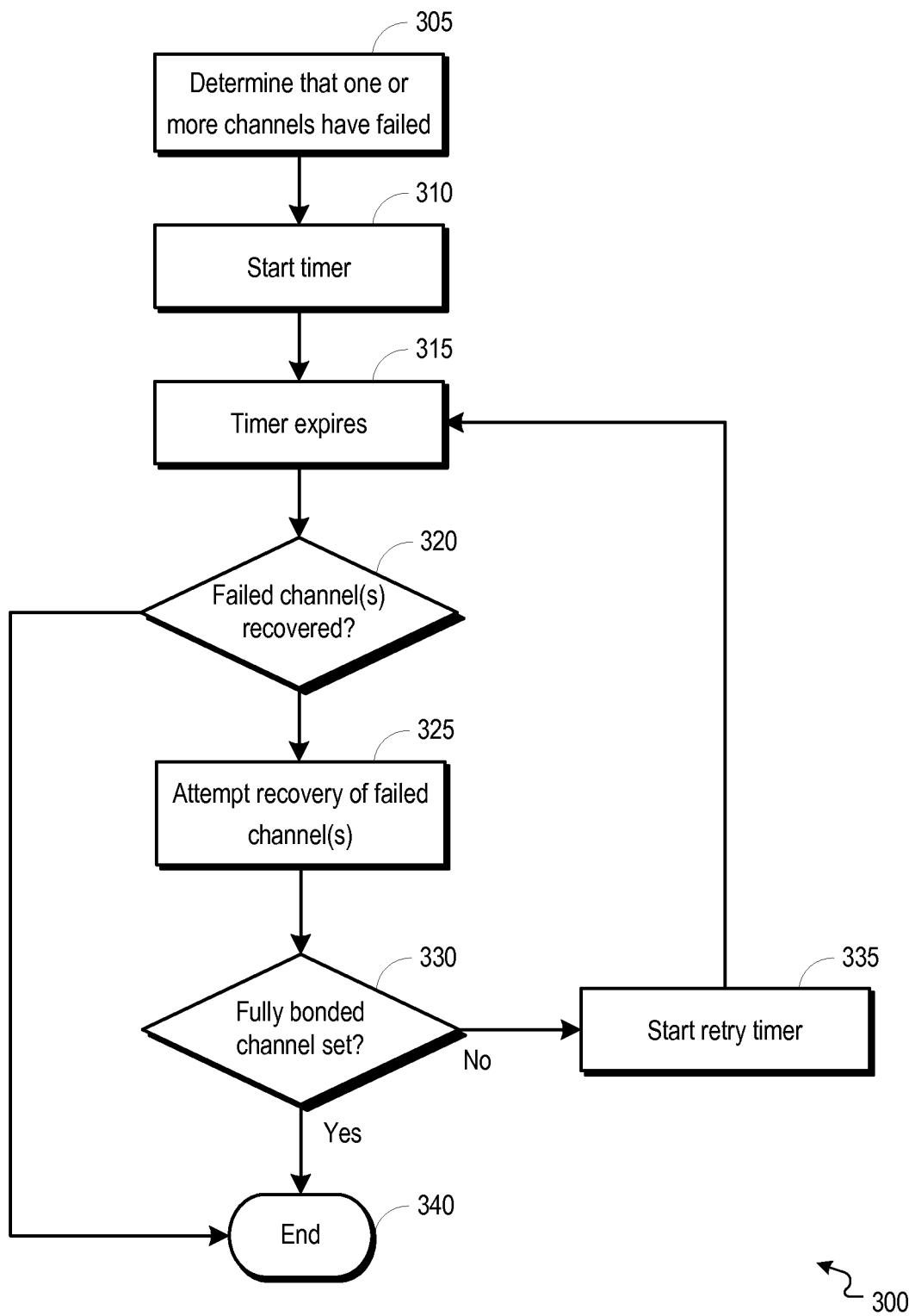
FIG. 3 is a flowchart illustrating an example process operable to facilitate the recovery of a failed data path.

FIG. 3 is a flowchart illustrating an example process 300 operable to facilitate the recovery of a failed data path. The process 300 can begin at 305, when a determination is made that a central device (e.g., central device 115 of FIG. 1) is in a partial service state. In embodiments, a central device can enter a partial service state when one or more channels of a bonded downstream or upstream channel set have failed. In embodiments, a central device 115 can verify that the partial service state was not caused by the central device 115 being put into a power-saving mode.

At 310, a timer can be started when the determination is made that the central device is in a partial service state. The timer may be set for a predetermined or configurable period of time (e.g., thirty (30) minutes, one (1) hour, two (2) hours, ten (10) hours, etc.). For example, the predetermined period of time may be for a duration of time sufficient to allow the central device to make an attempt to resolve the issue with the affected upstream channel(s). A re-initialization attempt may cause a subscriber to lose access to an upstream network, so the predetermined period of time may be set to a long enough duration such that a persistent partial service state will not lead to frequent re-initialization attempts. It should be understood that the predetermined period of time may be set or modified by an upstream network element (e.g., using a management information base (MIB)).

At 315, the timer can expire. When the timer expires at 315, the process 300 can proceed to 320. At 320, the determination may be made whether the failed channel(s) have been recovered. If the central device 115 is able to successfully communicate with a headend device on each of the upstream channels available to the central device 115, then the central device 115 can make the determination that the recovery attempt resulted in a fully bonded channel set. For example, a previous issue with the failed channel(s) may have been resolved and the central device 115 may have received transmission opportunity grant(s) for the failed channel(s) subsequent to the determination that the channel(s) had failed. If the determination is made that the failed channel(s) have been recovered, the process 300 may proceed to 340.

If, at 320, the determination is made that the failed channel(s) have not been recovered, the process 300 may proceed to 325. At 325, the central device can attempt to recover the one or more failed upstream channels. In embodiments, the central device can make a re-initialization attempt. For example, the central device 115 of FIG. 1 can start a re-initialization attempt (e.g., using a reinitMAC command), wherein the re-initialization attempt causes a re-initialization of a communication interface (e.g., radio frequency (RF) interface, media access control (MAC) interface, etc.) associated with the central device 115.

At 330, the determination is made whether the attempt to recover the failed upstream channel(s) resulted in a fully bonded channel set. In embodiments, during re-initialization with an upstream network element (e.g., headend device such as a CMTS), the central device 115 of FIG. 1 may receive information identifying a number of upstream channels that are available to the central device 115 within one or more upstream bonded channel groups (e.g., TCS). If the central device 115 is able to successfully communicate with a headend device on each of the upstream channels available to the central device 115, then the central device 115 can make the determination that the recovery attempt resulted in a fully bonded channel set. If the central device 115 is not able to successfully communicate with a headend device on each of the upstream channels available to the central device 115, then the central device 115 can make the determination that the recovery attempt failed to provide a fully bonded channel set.

If at 330, the determination is made that the attempt to recover the failed upstream channel(s) did not result in a fully bonded channel set, the process 300 can proceed to 335. At 335, a retry timer may be started. In embodiments, the retry timer may be set to a predetermined or configurable duration. The duration of the retry timer may be set to a duration of time that is sufficient to allow the failed upstream channel(s) to be recovered. It should be understood that the retry timer may be set to a duration that is equivalent to the initial timer, or the duration of the retry timer may be increased each time a recovery attempt fails to provide a fully bonded channel set (e.g., the retry timer may be set to two (2) hours after a first failed recovery attempt, four (4) hours after a second failed recovery attempt, twelve (12) hours after a third failed recovery attempt, etc.). The retry timer may be increased after each failed recovery attempt so that a user does not experience a loss of service caused by re-initialization attempts occurring at a frequent or consistent rate. After the retry timer is started, the process 300 can return to 315.

If at 330, the determination is made that the attempt to recover the failed upstream channel(s) results in a fully bonded channel set, the process can end at 340.

Figure 4:
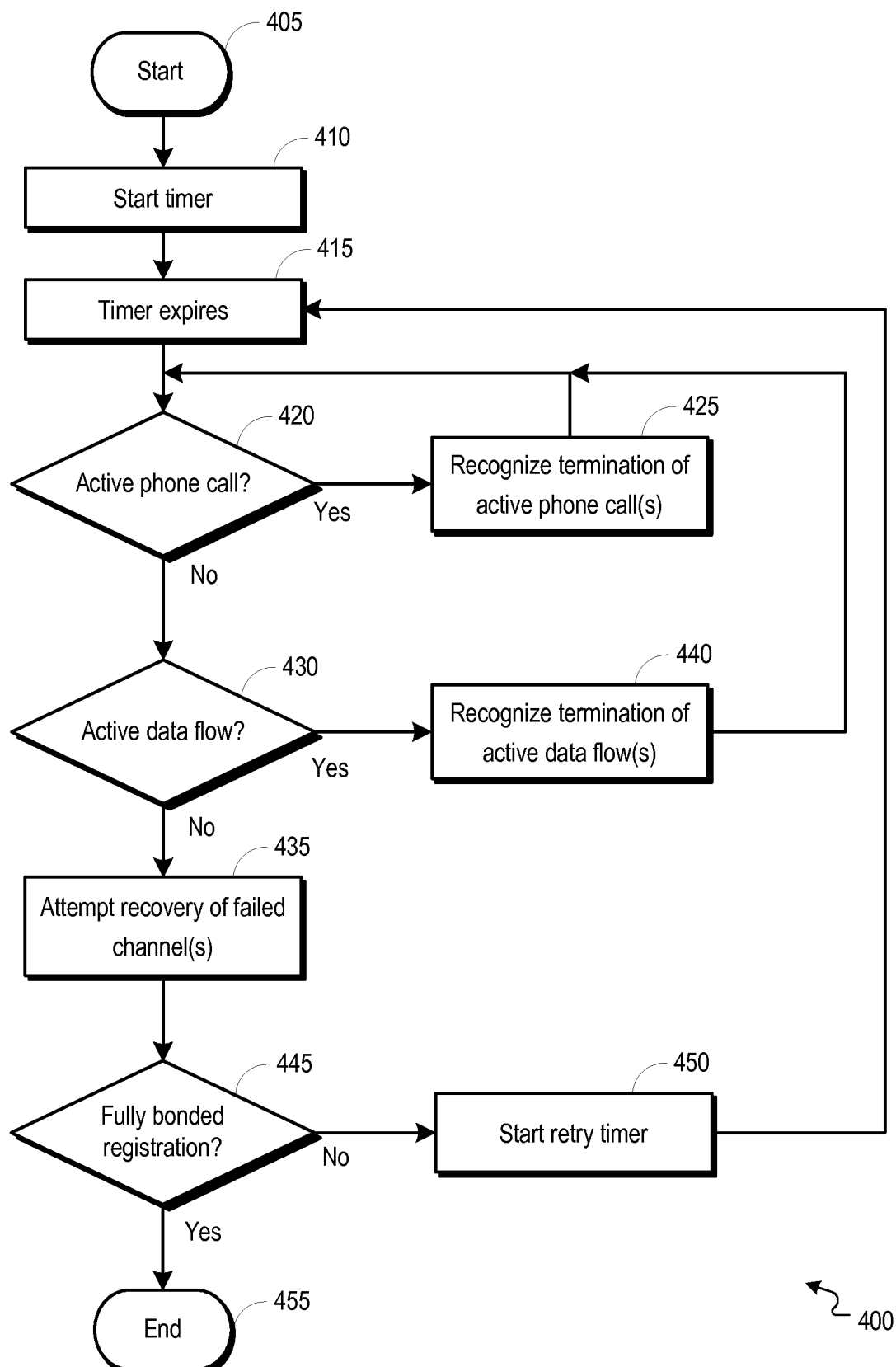
FIG. 4 is a flowchart illustrating another example process operable to facilitate the recovery of a failed data path.

FIG. 4 is a flowchart illustrating another example process 400 operable to facilitate the recovery of a failed data path. The process 400 can begin at 405, when a determination is made that a central device (e.g., central device 115 of FIG. 1) is in a partial service state. In embodiments, a central device can enter a partial service state when one or more channels of a bonded downstream or upstream channel set have failed. In embodiments, a central device 115 can verify that the partial service state was not caused by the central device 115 being put into a power-saving mode.

At 410, a timer can be started when the determination is made that the central device is in a partial service state. The timer may be set for a predetermined or configurable period of time (e.g., thirty (30) minutes, one (1) hour, two (2) hours, ten (10) hours, etc.). For example, the predetermined period of time may be for a duration of time sufficient to allow the central device to make an attempt to resolve the issue with the affected upstream channel(s). A re-initialization attempt may cause a subscriber to lose access to an upstream network, so the predetermined period of time may be set to a long enough duration such that a persistent partial service state will not lead to frequent re-initialization attempts. It should be understood that the predetermined period of time may be set or modified by an upstream network element (e.g., using a MIB).

At 415, the timer can expire. When the timer expires at 415, the process 400 can proceed to 420. At 420, the determination is made whether a phone call is active at the central device. In embodiments, the central device may determine whether a phone call is active by checking for activity at each of one or more interfaces associated with the central device (e.g., telephony interface, downstream interface 210 of FIG. 2, upstream interface 215 of FIG. 2, local network interface 225 of FIG. 2, etc.).

If at 420, the determination is made that there is at least one phone call active, the process 400 can proceed to 425. At 425, the central device can monitor for and ultimately recognize the termination of the phone call(s). For example, the central device can start a call timer of a predetermined duration. At the expiration of the call timer, the central device can check whether one or more phone call(s) are still active. As another example, the central device can register to receive notification when the active call(s) are terminated. After termination of the active phone call(s) is recognized, the central device can again check for any active phone call(s) at 420.

Returning to 420, if the determination is made that there are no phone calls active, the process 400 can proceed to 430. At 430, the determination is made whether one or more data flows are active at the central device. In embodiments, the central device may determine whether one or more data flows are active by monitoring the one or more downstream (e.g., through the downstream interface 210 of FIG. 2) and/or upstream (e.g., through the upstream interface 215 of FIG. 2) channels through which data is received or transmitted. The determination whether one or more data flows are active may be based upon the amount of data received by the central device along one or more downstream data channels. For example, if the bandwidth of data received by the central device is greater than a predetermined threshold (e.g., the bandwidth that might be expected when receiving a data flow associated with a gaming session, video streaming, etc.), then the determination can be made that one or more data flows are active. If the bandwidth of data received by the central device is less than the predetermined threshold, then the determination can be made that there are no active data flows.

If at 430, the determination is made that there are no data flows active, the process 400 can proceed to 435. At 435, the central device can attempt to recover the one or more failed upstream channels. In embodiments, the central device can make a re-initialization attempt. For example, the central device 115 of FIG. 1 can start a re-initialization attempt (e.g., using a reinitMAC command), wherein the re-initialization attempt causes a re-initialization of a communication interface (e.g., RF interface, MAC interface, etc.) associated with the central device 115.

Returning to 430, if the determination is made that there is at least one data flow active, the process 400 can proceed to 440. At 440, the central device can monitor for and ultimately recognize the termination of the data flow(s). For example, the central device can start a data flow timer of a predetermined duration. At the expiration of the data flow timer, the central device can check whether one or more data flows are still active. As another example, the central device can register to receive a notification when the active data flow(s) are terminated. After termination of the active data flow(s) is recognized, the process 400 can return to 420.

At 445, the determination is made whether the attempt to recover the failed channel(s) resulted in a fully bonded channel set. In embodiments, during re-initialization with an upstream network element (e.g., headend device such as a CMTS), the central device 115 of FIG. 1 may receive information identifying a number of upstream channels that are available to the central device 115 within one or more upstream bonded channel groups (e.g., TCS). If the central device 115 is able to successfully communicate with a headend device on each of the upstream channels available to the central device 115, then the central device 115 can make the determination that the recovery attempt resulted in a fully bonded channel set. If the central device 115 is not able to successfully communicate with a headend device on each of the upstream channels available to the central device 115, then the central device 115 can make the determination that the recovery attempt failed to provide a fully bonded channel set.

If, at 445, the determination is made that the attempt to recover the failed upstream channel(s) did not result in a fully bonded channel set, the process 400 can proceed to 450. At 450, a retry timer may be started. In embodiments, the retry timer may be set to a predetermined or configurable duration. The duration of the retry timer may be set to a duration of time that is sufficient to allow the failed upstream channel(s) to be recovered. It should be understood that the retry timer may be set to a duration that is equivalent to the initial timer, or the duration of the retry timer may be increased each time a recovery attempt fails to provide a fully bonded channel set (e.g., the retry timer may be set to two (2) hours after a first failed recovery attempt, four (4) hours after a second failed recovery attempt, twelve (12) hours after a third failed recovery attempt, etc.). The retry timer may be increased after each failed recovery attempt so that a user does not experience loss of service caused by re-initialization attempts occurring at a frequent or consistent rate. After the retry timer is started, the process 400 can return to 415.

If at 445, the determination is made that the attempt to recover the failed upstream channel(s) results in a fully bonded channel set, the process 400 can end at 455.

Figure 5:
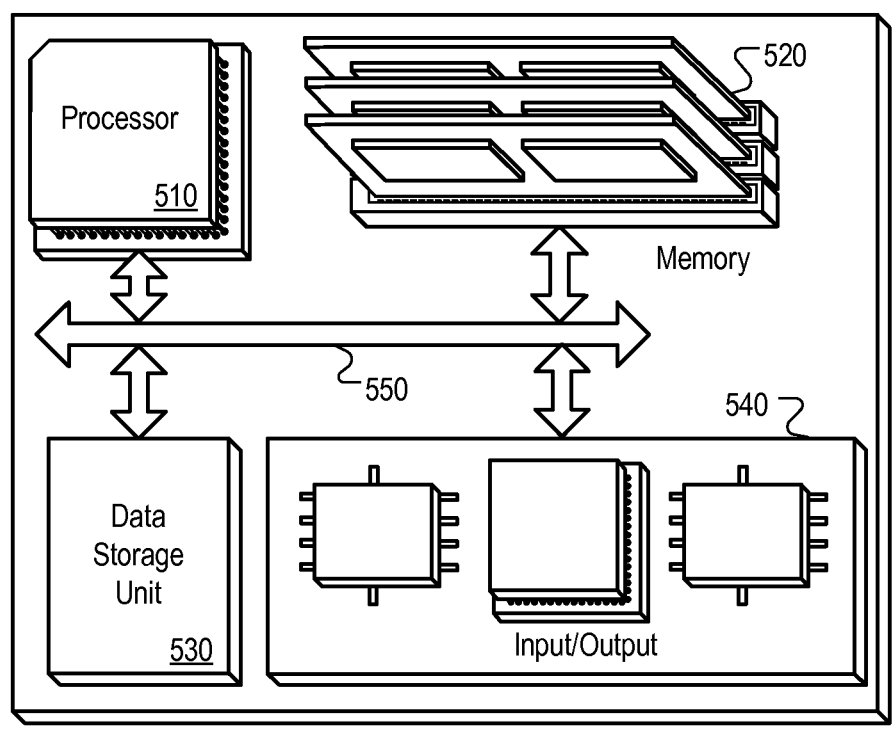
FIG. 5 is a block diagram of a hardware configuration operable to facilitate the recovery of a failed data path.

FIG. 5 is a block diagram of a hardware configuration 500 operable to facilitate the recovery of a failed data path. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.). In another implementation, the input/output device can include driver devices configured to send communications to, and receive communications from one or more networks (e.g., local network 110, provider network 125 of FIG. 1, WAN 120 of FIG. 1, etc.).

Those skilled in the art will appreciate that the invention improves upon methods and systems for recovering a failed data path. A determination may be made that one or more channels have become unavailable to a central device. The central device may identify an opportunity to attempt to recover the one or more unavailable channels, the opportunity being based upon a waiting period, time-of-day, device activity, and others. A communication interface associated with the central device may be re-initialized so that the central device can attempt to recover the one or more unavailable channels.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:
1. A method comprising:
determining that a first subset of channels within a bonded channel set have become unavailable for a central device, while a second subset of channels within the bonded channel set are available to the central device;
determining that central device is no longer receiving transmit opportunities for the first subset of channels from a headend device;
starting a first timer, wherein the first timer is set for a first duration, and wherein the first timer is set at the central device;
detecting, at the central device, an expiration of the first timer;
in response to the detection of the expiration of the first timer, determining whether the one or more channels within the bonded channel set that were determined to be unavailable for the central device have become available for the central device; and
if the determination is made that the one or more channels within the bonded channel set have not become available for the central device, re-initializing a communication interface associated with the central device, wherein re-initialization of the communication interface comprises a re-initialization of each channel within the first subset of channels and each channel within the second subset of channels, and wherein the re-initialization of the communication interface causes the central device to make an attempt to re-establish communications along each channel within the bonded channel set.
2. The method of claim 1, further comprising:
after re-initializing the communication interface, determining that each channel within the bonded channel set is available for the central device.

3. The method of claim 1, further comprising:
after re-initializing the communication interface, determining that one or more channels within the bonded channel set are unavailable for the central device;
starting a second timer, wherein the second timer is set for a second duration, the second duration being a different duration than the first duration; and
when the second timer expires, re-initializing the communication interface associated with the central device, wherein re-initialization of the communication interface comprises a re-initialization of all channels within the bonded channel set, and wherein the re-initialization of the communication interface causes the central device to make a subsequent attempt to re-establish communications along each channel within the bonded channel set.

4. The method of claim 3, further comprising:
after the subsequent attempt to re-establish communications along each channel within the bonded channel set, determining that one or more channels within the bonded channel set are unavailable for the central device;
starting a third timer, wherein the third timer is set for a third duration, the third duration being a longer duration than the second duration; and
when the third timer expires, re-initializing the communication interface associated with the central device, wherein re-initialization of the communication interface comprises a re-initialization of all channels within the bonded channel set, and wherein the re-initialization of the communication interface causes the central device to make a subsequent attempt to re-establish communications along each channel within the bonded channel set.

5. The method of claim 1, wherein the first timer is started after determining that the central device is not in a power-saving mode.

6. The method of claim 1, further comprising:
after the first timer expires, and before re-initializing the communication interface associated with the central device, determining that a call is active at the central device; and
delaying re-initialization of the communication interface until after determining that the call has been terminated.

7. The method of claim 1, further comprising:
after the first timer expires, and before re-initializing the communication interface associated with the central device, determining that a data flow is active at the central device; and
delaying re-initialization of the communication interface until after determining that the data flow has been terminated.

8. The method of claim 1, further comprising:
when the first timer expires outside of a designated period of time, postponing the re-initialization of the communication interface associated with the central device until the designated period of time.

9. An apparatus comprising a processor executing instructions stored in a memory to provide:
a communication interface that outputs upstream communications along a plurality of channels within a bonded upstream channel set;
a monitoring module that:
determines that a first subset of channels within the bonded upstream channel set have become unavailable for outputting upstream communications through the communication interface, while a second subset of channels within the bonded upstream channel set are available for outputting upstream communications through the communication interface; and
determines that central device is no longer receiving transmit opportunities for the first subset of channels from a headend device;
a re-initialization module that:
starts a first timer, wherein the first timer is set for a first duration;
detects an expiration of the first timer; and
in response to the detection of the expiration of the first timer, re-initializes the communication interface, wherein re-initialization of the communication interface comprises a re-initialization of each channel within the first subset of channels and each channel within the second subset of channels, and wherein the re-initialization of the communication interface causes an attempt to re-establish communications along each channel within the upstream bonded channel set.

10. The apparatus of claim 9, wherein:
the monitoring module further:
determines that one or more channels within the bonded upstream channel set are unavailable for outputting upstream communications through the communication interface, after the communication interface is re-initialized; and
the re-initialization module further:
starts a second timer, wherein the second timer is set for a second duration, the second duration being a different duration than the first duration; and
when the second timer expires, re-initializes the communication interface, wherein re-initialization of the communication interface comprises a re-initialization of all channels within upstream bonded channel set, and wherein the re-initialization of the communication interface causes an attempt to re-establish communications along each channel within the upstream bonded channel set.

11. The apparatus of claim 9, wherein the re-initialization module further:
after the first timer expires, and before re-initializing the communication interface, determines that a call is active; and
delays re-initialization of the communication interface until after determining that the call has been terminated.

12. The apparatus of claim 9, wherein the re-initialization module further:
after the first timer expires, and before re-initializing the communication interface, determines that a data flow is active; and
delays re-initialization of the communication interface until after determining that the data flow has been terminated.

13. The apparatus of claim 9, wherein the re-initialization module further:
when the first timer expires outside of a designated period of time, postpones the re-initialization of the communication interface until the designated period of time.

14. One or more non-transitory computer readable media having instructions operable to cause one or more processors to perform the operations comprising:
determining that a first subset of channels within a bonded channel set have become unavailable for a central device, while a second subset of channels within the bonded channel set are available for the central device;

determining that central device is no longer receiving transmit opportunities for the first subset of channels from a headend device;

starting a first timer, wherein the first timer is set for a first duration, and wherein the first timer is set at the central device;

detecting, at the central device, an expiration of the first timer;

in response to the detection of the expiration of the first timer, determining whether the one or more channels within the bonded channel set that were determined to be unavailable for the central device have become available for the central device; and if the determination is made that the one or more channels within the bonded channel set have not become available for the central device, re-initializing a communication interface associated with the central device, wherein re-initialization of the communication interface comprises a re-initialization of each channel within the first subset of channels and each channel within the second subset of channels, and wherein the re-initialization of the communication interface causes the central device to make an attempt to re-establish communications along each channel within the bonded channel set.

15. The one or more non-transitory computer-readable media of claim 14, wherein the instructions are further operable to cause one or more processors to perform the operations comprising:

after re-initializing the communication interface, determining that each channel within the bonded channel set is available for the central device.

16. The one or more non-transitory computer-readable media of claim 14, wherein the instructions are further operable to cause one or more processors to perform the operations comprising:

after re-initializing the communication interface, determining that one or more channels within the bonded channel set are unavailable for the central device;

starting a second timer, wherein the second timer is set for a second duration, the second duration being a different duration than the first duration; and when the second timer expires, re-initializing the communication interface associated with the central device, wherein re-initialization of the communication interface comprises a re-initialization of all channels within the bonded channel set, and wherein the re-initialization of the communication interface causes the central device to make an attempt to re-establish communications along each channel within the bonded channel set.

17. The one or more non-transitory computer-readable media of claim 14, wherein the first timer is started after determining that the central device is not in a power-saving mode.

18. The one or more non-transitory computer-readable media of claim 14, wherein the instructions are further operable to cause one or more processors to perform the operations comprising:

after the first timer expires, and before re-initializing the communication interface associated with the central device, determining that a call is active at the central device; and delaying re-initialization of the communication interface until after determining that the call has been terminated.

19. The one or more non-transitory computer-readable media of claim 14, wherein the instructions are further operable to cause one or more processors to perform the operations comprising:

after the first timer expires, and before re-initializing the communication interface associated with the central device, determining that a data flow is active at the central device; and delaying re-initialization of the communication interface until after determining that the data flow has been terminated.

20. The one or more non-transitory computer-readable media of claim 14, wherein the instructions are further operable to cause one or more processors to perform the operations comprising:

when the first timer expires outside of a designated period of time, postponing the re-initialization of the communication interface associated with the central device until the designated period of time.

* * * * *